No. 841,991. PATENTED JAN. 22, 1907.
J. W. LOVE.
STEERING DEVICE FOR WHEELED VEHICLES.
APPLICATION FILED AUG. 5, 1905.

2 SHEETS—SHEET 1.

WITNESSES:
A. C. Abbott
E. E. Ellis

INVENTOR
John W. Love
BY Munn & Co.
ATTORNEYS

No. 841,991. PATENTED JAN. 22, 1907.
J. W. LOVE.
STEERING DEVICE FOR WHEELED VEHICLES.
APPLICATION FILED AUG. 5, 1905.
2 SHEETS—SHEET 2.
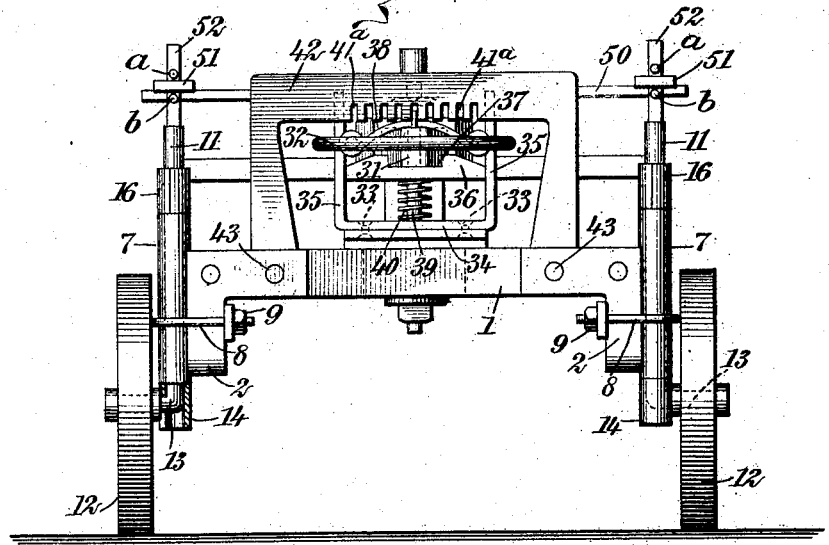
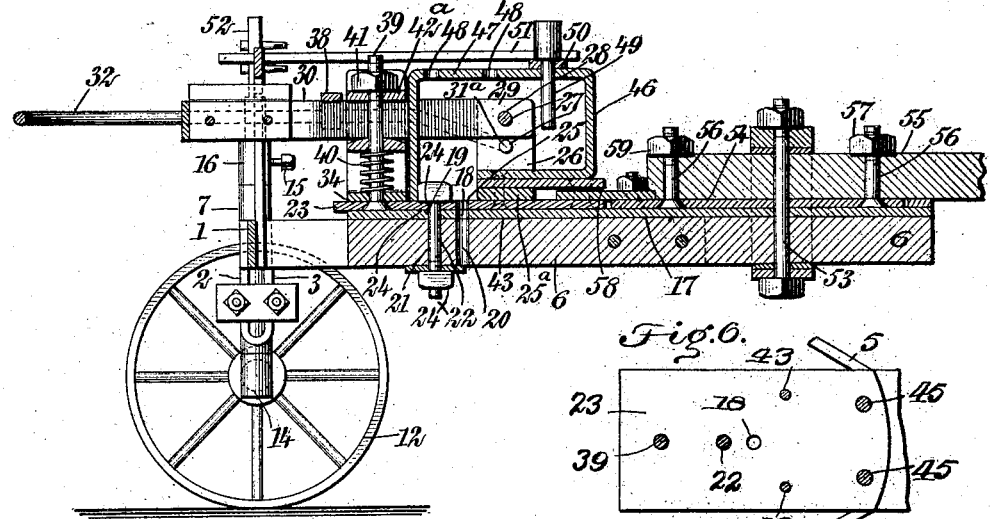
WITNESSES:
INVENTOR
John W. Love
BY
ATTORNEYS

UNITED STATES PATENT OFFICE.

JOHN WILLIAM LOVE, OF TRUBY, TEXAS.

STEERING DEVICE FOR WHEELED VEHICLES.

No. 841,991.  Specification of Letters Patent.  Patented Jan. 22, 1907.

Application filed August 5, 1905. Serial No. 272,851.

*To all whom it may concern:*

Be it known that I, JOHN WILLIAM LOVE, a citizen of the United States, and a resident of Truby, in the county of Jones and State of Texas, have invented new and Improved Steering Devices for Wheeled Vehicles, of which the following is a full, clear, and exact description.

This invention relates to wheeled vehicles; and it consists, substantially, in the details of construction and combinations of parts more particularly described hereinafter and pointed out in the claims.

The invention has reference more especially to steering devices for wheeled vehicles, such as cultivators, planters, sulky-plows, grain-drills, and the like; and one of the principal objects thereof is to overcome numerous disadvantages and objections frequently encountered in the use of other contrivances or structures hitherto devised for similar purposes.

A further object is to provide devices for enabling the wheels of a vehicle of any of the types referred to to be readily shifted in either direction in conformity with varying requirements of use of the vehicle in the field—as, for instance, when effecting either long or short turnings thereof, either at the end of a row or when turning the vehicle to effectively operate the same in its return over the field.

A still further object is to provide devices of this kind which are simple in their embodiment and comparatively inexpensive to manufacture and which are effective and reliable in use, besides possessing the capacity for long and repeated service.

The above and additional objects are attained by means substantially such as are illustrated in the accompanying drawings, orming a part of this specification, in which similar characters of reference indicate corresponding parts in all the views.

Figure 1:
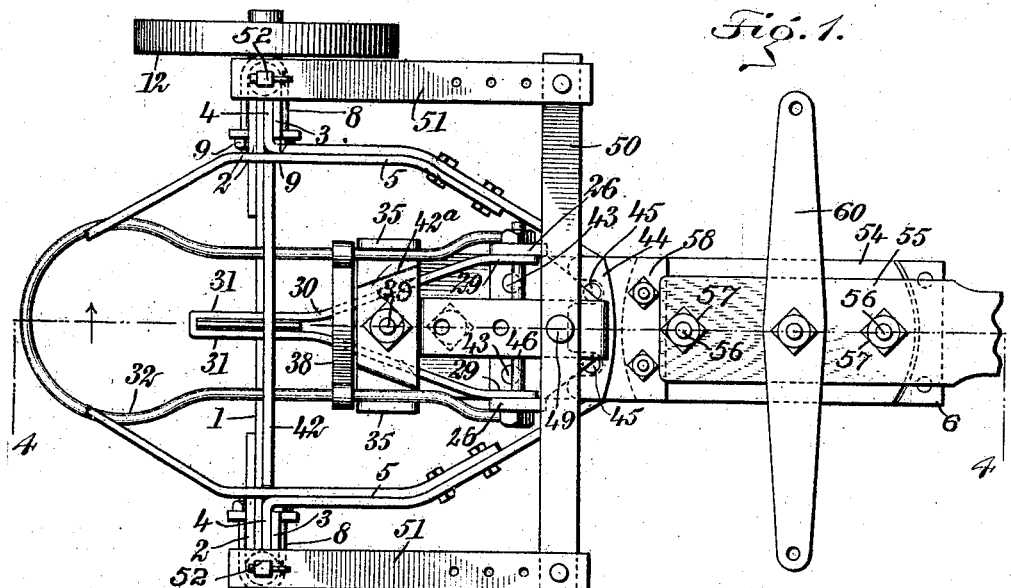
Figure 2:
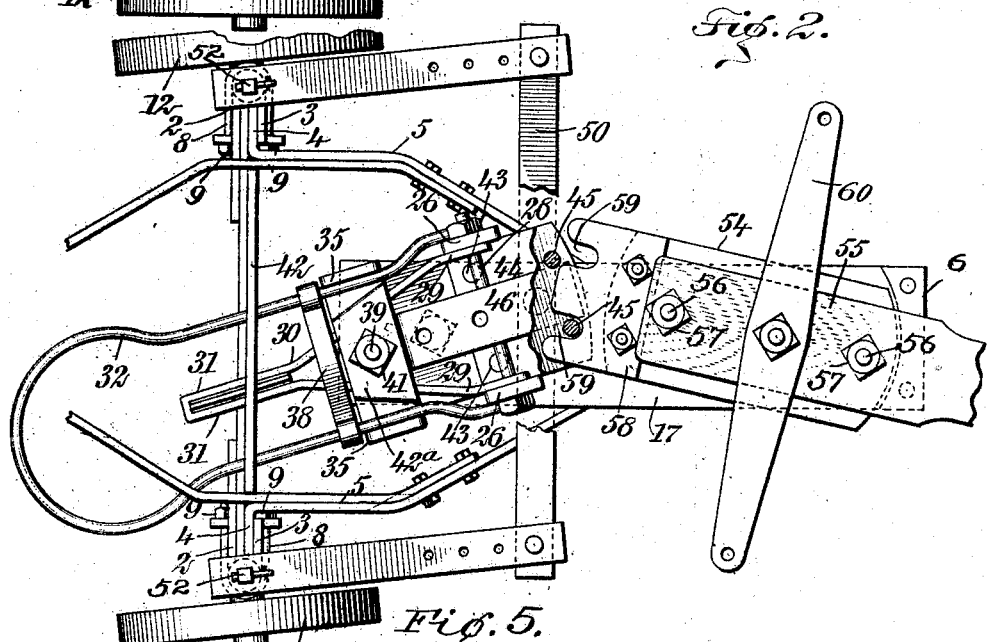
Figure 5:
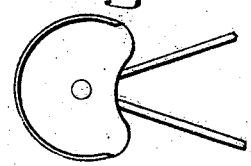

Figure 1 is a top plan view of steering devices for vehicles embodying my improvements. Fig. 2 is a similar view with parts broken away and illustrating the manner in which the devices are operated for effecting a shifting or turning of the wheels of a vehicle. Fig. 3 is a rear end elevation, and Fig. 4 is a longitudinal sectional view on the line 4 4 of Fig. 1. Fig. 5 is a plan view of the seat.

Before proceeding with a more detailed description it may be stated that in the form of my improvements herein shown I employ a truck of ordinary construction, which may form a part of the cultivator, plow, or the like in connection with which my improvements are to be employed, but which is preferably constructed independently, so as to be readily attached to the vehicle in any desired manner for enabling the performance of the functions of the steering devices to be properly carried out.

My improved steering devices comprise special means directly associated with the tongue of the vehicle by which the proper steering of the wheels of the truck may be accomplished in either direction and also other special means directly associated with part of the special means first referred to for effecting the same results. The said last-named special means are adapted to be operated either by the hand or foot of the operative in charge of the vehicle or cultivating operations in the field, and while I have herein represented my improvements in a certain preferred embodiment it will be understood, of course, that I am not limited thereto in precise detail, since immaterial changes therein may be resorted to coming within the scope of my invention.

The two sets of devices hereinabove referred to in a general way are adapted for cooperation with each other and are also capable of independent operation, accordingly as may be desired in use, as will hereinafter be more particularly explained. In other words, the devices having direct association with the tongue of the vehicle may under some circumstances be amply sufficient to effect the necessary shifting or turning of the vehicle, whereas, contrarily, the devices to be operated either by the hand or the foot of the operative may also in themselves be sufficient for the purpose of steering the vehicle under some circumstances. On the other hand, there are certain conditions under which the cultivator, planter, plow, or the like may be operated, which for the purpose of more quickly and effectually swinging or turning the same may render it desirable that both sets of the devices referred to be employed coöperatively. Hence my invention will be understood to comprehend the combination of the two sets of said devices as well as either of them separately.

Reference being had to the drawings by the designating characters thereon, 1 represents an axle, preferably in the form of a flat piece of metal of suitable length and other dimensions and secured to the ends of which are hangers 2, constructed of pendent loops of metal, between the inner member 3 of each of which and the opposite forward surface portion of the said axle is secured the bent rearward extremity 4 of a member 5 of a rearwardly-extending horizontal frame the forward extremities of which are secured in any suitable manner (not shown) to the sides of a longitudinally-extending timber 6. Adjacent to each of the said hangers or pendent loops 2 is a vertically-disposed sleeve 7, which is secured to the said hanger or loop by means of a metal strap 8 and fastening-nuts 9 for the ends thereof, a portion of the body of said sleeve being partially received within the space separating the two members of the hanger or loop. (See, for instance, dotted lines in Figs. 1 and 2.) In this way each of the said vertically-disposed sleeves is firmly secured in position and prevented from tilting, as is apparent, and it will be noted that each sleeve constitutes a bearing for the vertical spindle 11 of one of the supporting-wheels 12 of the vehicle of my improvements, said spindle being provided at the lower end thereof with an outwardly-extending journal 13, on which the wheel is mounted in the ordinary way. At the intersection of each of said journals with the spindle to which it belongs is located a collar 14, upon which the lower end of the vertical sleeve 7 rests in operation, while the upper part of the spindle has secured thereto in any suitable way, as by means of a set-screw 15, a split collar 16, which is tightened upon the spindle by means of the screw at any desired position vertically. Thus it will be seen that by loosening nuts 9 the hangers 2 may be raised or elevated upon the sleeves 7, and the frame of the vehicle will be raised or lowered correspondingly.

The upper surface of the timber 6 is preferably provided with a face-plate 17, provided in the rearward portion thereof with two or more openings 18 and 19, registering with corresponding openings 20 and 21, formed through the timber, said face-plate being secured in position by means of a bolt 22, passing through either set of the said mentioned openings, as indicated more clearly in Fig. 4. Mounted upon the face-plate, by means of the said bolt 22, is a swing-plate 23, adapted to swing in either direction upon the said bolt, and which swing-plate is provided with openings 24 and 25 for registering with the aforesaid sets of openings just mentioned as being formed in the said timber 6 and face-plate 17. In this way the swing-plate 23 is capable of longitudinal adjustment either forwardly or rearwardly of the vehicle by simply withdrawing the bolt 22 after the removal of the fastening-nut $24^{\times}$ therefor on the under side of the timber 6.

Secured to the forward end of the swing-plate 23 is a transverse yoke $25^a$, the vertical parallel members 26 of which are provided with corresponding vertically-disposed openings 27, while supported transversely of the frame of the vehicle is a headed rod 28, which is supported in openings therefor in the said vertical parallel members 26 of the yoke, said rod having mounted thereon just within the vertical parallel members of the yoke the forward terminals 29 of a vertically-adjustable frame 30, the rearward terminals 31 of the side members of which are united together in any suitable way and extend somewhat beyond the hereinbefore-mentioned axle 1. (See, for instance, Figs. 1 and 2.) The said corresponding holes in the vertical parallel members of the said mentioned yoke are for the reception of the inwardly-bent forward terminals $31^a$ of a vertically-swinging lever or frame 32, which extends rearwardly of the vehicle for any desired distance and which may be conveniently operated by either the hand or the foot of the operative, as and for the purpose hereinafter more particularly explained.

Secured to the upper surface of the hereinbefore-mentioned swing-plate 23, by means of screws 33 or the like, is the base 34 of a rearwardly-located yoke, between the vertical parallel members 35 of which is located a vertically-movable block 36, which is formed with a notch 37, in which are received portions of the lower edges of the hereinbefore-mentioned side members of said vertically-adjustable frame. Extending transversely across the upper edge of the said side members of the vertically-adjustable frame 30 is a guide 38, in which are received the parallel portions of the said vertically-swinging lever or frame 32, and extending upwardly from the base of the hereinbefore-mentioned rearwardly-located yoke is a screw-rod 39, on which the said block 36 is slidably mounted, a spring 40 being interposed between the said block and the said base and surrounding the said rod, as shown in Fig. 3. This rod is provided at the upper portion thereof with a nut 41, by the proper manipulation of which the tension of the said spring 40 may be regulated to impart to the block a greater or less force in an upward direction, and thereby require a greater or less pressure to be exerted downwardly upon the said adjustable frame 30, by which to depress the latter against the action of the said spring. The construction and organization of the parts described are such that portions of the parallel side members of the vertically-swinging lever or frame are received in notches $41^a$, formed in the lower edge of a transversely-extended member 42, having the ends thereof secured at 43, preferably to the forward face of the hereinbefore-mentioned axle 1 of the vehicle. Normally the force of the spring 40, acting upon the under surface of the block 36, is such as to maintain the parallel side members of the lever or frame 32 in engagement with any desired ones of the said notches, accordingly as the frame and parts coöperating therewith are turned laterally in one direction or the other, as will be presently explained, such turning being effected by first depressing the said lever or frame against the force or tension of the said spring by which to release the said parallel members thereof from the said notches. This lever or frame may be hand-operated by the operator located rearwardly of the vehicle, either walking or seated upon the cultivator, planter, plow, or other vehicle, or else the same may be operated directly from the foot of the operator, whichever is most convenient and best suited to the particular circumstances under which my improvements may be employed. Mounted upon the upper part of the said screw-rod 39 is a transversely-extending plate 42ª, preferably curved downwardly at the ends, so as to practically embrace the hereinbefore-mentioned side members of the vertically-adjustable frame, the adjusting-nut 41 for this screw having direct bearing on the upper surface of the said plate, thus to enable adjustments of the spring 40 to be more readily performed by the simple turning of the nut in one direction or the other.

Secured between the hereinbefore-mentioned vertical parallel members 26 of the first-mentioned yoke on the swing-plate 23 by means of the same screws or rivets 43 which secure the base of the said yoke to the said swing-plate is a plate 44, which extends beyond the said base a suitable distance and is united with the swing-plate, near the forward edge thereof, by means of pins 45, (preferably two in number,) while also secured in rigid position with reference to both the said plate 44 and the swing-plate 23 by means of the same screws or rivets 43 is an upwardly and rearwardly extending rigid member 46, provided in the horizontal portion 47 thereof with openings 48, disposed at suitable intervals from each other longitudinally of the vehicle. The rearwardly and downwardly extending extremity of this member is carried to a position substantially directly in front of the hereinbefore-mentioned screw-rod 39. The said openings 48 are for the reception of a pin 49 to hold in position a transverse rod 50, provided at the ends thereof with suitable openings adapted to be brought into registry with corresponding openings formed in parallel longitudinally-extending links 51, the rearward ends of which are provided with squared openings, in which are received the upper squared portions 52 of the hereinbefore-mentioned spindles 11 for the wheels of the vehicle.

Extending through an opening in the forward part of the timber 6 of the vehicle is a vertically-disposed bolt 53, which also extends through a corresponding opening in the said face-plate 17, as well as another corresponding opening in an additional swing-plate 54, located above the face-plate and being normally in substantial alinement with the swing-plate 23, already referred to. This swing-plate 54 is secured to the under side of the rearward portion 55 of the tongue of the vehicle by means of bolts 56 and securing-nuts 57, and secured to the inner end or extremity thereof is what I may term a "middle" plate 58, having formed in its rearward edge duplicate notches 59, in which are normally received the pins 45 hereinbefore referred to. The said rearward portion 55 of the tongue is of course capable of being swung in either direction horizontally within certain limits, as will be understood, and any suitable draft appliance may be employed in connection with the tongue—as indicated at 60, for instance—for attachment to the vehicle of the usual draft-animals for drawing the same.

From the foregoing description it is thought the construction of my improvements will be fully understood, and the operation thereof may be described in a general way as follows: Under normal conditions, or when the vehicle is being propelled in a direct line, the several elements or members of my improvements will be in the positions thereof indicated in Fig. 1. Should it be desired to swing the wheels of the vehicle in one direction or the other to effect either a full or partial turn of the vehicle, it is simply necessary to press the parallel members of the vertically-swinging frame 32 in such a manner as to cause said members to become disengaged from those of the notches 41ª within which they were seated, whereupon by imparting the necessary lateral movement to either the tongue of the vehicle or the said vertically-swinging frame the desired action or result will be secured, as is apparent. By proper adjustment of the parallel links with reference to the transverse bar the swinging or turning of the wheels may be caused to take place on curves or arcs of circles of greater or less extent, according as may be desired in practice, and it will be observed that the squared portions of the said spindles 11 are provided therethrough with corresponding openings a for the reception of keys b for enabling the heights of the connections between said spindles and the transverse bar to be varied according to variations of vertical positions of the spindle within the hereinbefore-mentioned vertical sleeves or bearings therefor.

It is apparent that by dispensing with the said-mentioned middle plate 58 and rigidly connecting the tongue with its supports the turning or swinging of the wheels may be effected by simply operating the said vertically-swinging frame in the manner already described and turning the same in one direction or the other, whereas under some conditions the said vertically-swinging frame and the parts directly coöperating therewith may be dispensed with and the turning or swinging of the wheels effected directly from the swing-plate of the vehicle. I employ both sets of devices herein referred to, however, since under certain conditions of use of the vehicle in the field one set alone may not be entirely adequate for a full performance of the intended functions of the structure.

The positions of the parts when turned in one direction or the other are shown in Fig. 2, it being understood that the pins 45 and notches 59 of the middle plate 58 coöperate in furnishing working fulcra between the two sets of steering devices as the one set or the other is caused to be turned in one direction or the other.

Having thus described my invention, I claim as new and desire to secure by Letters Patent—

1. In steering devices for vehicles, of the character specified, the combination with a longitudinal timber, and a laterally-movable tongue, of a frame extending rearwardly from the timber, an axle connecting the rearward ends of the frame, hanger-loops secured to the ends of the axle, vertically-disposed sleeves secured thereto, spindles turnable in the sleeves and carrying wheels for the vehicle, and means intermediate of the tongue and spindles for turning the wheels in correspondence with movements imparted to the tongue in either direction.

2. In steering devices for vehicles, of the character specified, the combination with a longitudinal timber, and a laterally-movable tongue, of a frame extending rearwardly from the timber, an axle connecting the rearward ends of the frame, hanger-loops secured to the ends of the axle, vertically-disposed sleeves secured thereto, spindles turnable in the sleeves and carrying wheels for the vehicle, and means intermediate of the tongue and spindles for turning the wheels in correspondence with movements imparted to the tongue in either direction, embodying swing-plates and movable fulcra between the two.

3. In steering devices for vehicles, of the character specified, the combination with a longitudinal timber, and a laterally-movable tongue, of a frame extending rearwardly from the timber, an axle connecting the rearward ends of the frame, hanger-loops secured to the ends of the axle, vertically-disposed sleeves secured thereto, spindles turnable in the sleeves and carrying wheels for the vehicle, and means intermediate of the tongue and spindle for turning the wheels in correspondence with movements imparted to the tongue in either direction, embodying swing-plates and a middle plate between the two, one of said swing-plates carrying pins, and the middle plate having notches receiving the pins.

4. In steering devices for vehicles, of the character specified, the combination with a longitudinal timber, and a laterally-movable tongue, of a frame extending rearwardly from the timber, an axle connecting the rearward ends of the frame, hanger-loops secured to the ends of the axle, vertically-disposed sleeves secured thereto, spindles turnable in the sleeves and carrying wheels for the vehicle, and means intermediate of the tongue and spindles for turning the wheels in correspondence with movements imparted to the tongue in either direction, embodying swing-plates and movable fulcra between the two, both of said swing-plates being pivotally supported with reference to the timber, and one of them being rigid with the rearward portion of the tongue.

5. In steering devices for vehicles, of the character specified, the combination with a longitudinal timber, and a laterally-movable tongue, of a frame extending rearwardly from the timber, an axle connecting the rearward ends of the frame, hanger-loops secured to the ends of the axle, vertically-disposed sleeves secured thereto, spindles turnable in the sleeves and carrying wheels for the vehicle, and means intermediate of the tongue and spindles for turning the wheels in correspondence with movements imparted to the tongue in either direction, embodying a pivoted transverse bar and links connecting the ends of the same with said spindles.

6. In steering devices for vehicles, of the character specified, the combination with a longitudinal timber, and a laterally-movable tongue, of a frame extending rearwardly from the timber, an axle connecting the rearward ends of the frame, hanger-loops secured to the ends of the axle, vertically-disposed sleeves secured thereto, spindles turnable in the sleeves and carrying wheels for the vehicle, and means intermediate of the tongue and spindles for turning the wheels in correspondence with movements imparted to the tongue in either direction, embodying a pivoted transverse bar and links connecting the ends of the same with said spindles, said bar being adjustable longitudinally of the timber and said links having means for adjusting them as to length, with reference to the bar.

7. In steering devices for vehicles, of the character specified, the combination with a longitudinal timber, and a laterally-movable tongue, of a frame extending rearwardly from the timber, an axle connecting the rearward ends of the frame, hanger-loops secured to the ends of the axle, vertically-disposed sleeves secured thereto, spindles turnable in the sleeves and carrying wheels for the vehicle, and means intermediate of the tongue and spindles for turning the wheels in correspondence with movements imparted to the tongue in either direction, embodying a pivoted transverse bar and links connecting the ends of the same with said spindles, the upper ends of the spindles each being squared and having transverse holes therein, and provided with a fastening-pin for one of the links, whereby the height of the links relatively to the spindles may be varied.

8. In steering devices for vehicles, of the character specified, the combination with a longitudinal timber, and a tongue pivoted thereon to have lateral movement in either direction, of a frame extending rearwardly from the timber, a swing-plate above the rearward portion of the timber, a forward yoke and a rearward yoke, each rigid with the swing-plate, a vertically-movable frame supported by the forward yoke, a vertically-swinging frame pivoted to members of this yoke, a horizontal member rigid with and extending rearwardly from the forward yoke, a transverse bar pivoted upon the forward yoke, supporting-wheels and vertical spindles therefor, links movably connecting said spindles with said bar, a transverse member disposed between the wheels, and having notches therein, for receiving portions of said vertically-swinging frame, and means for exerting pressure upon this frame, tending to force such portions into the notches.

9. In steering devices for vehicles, of the character specified, the combination with a longitudinal timber, and a tongue pivoted thereon to have lateral movement in either direction, of a frame extending rearwardly from the timber, a swing-plate above the rearward portion of the timber, a forward yoke and a rearward yoke, each rigid with the swing-plate, a vertically-movable frame supported by the forward yoke, a vertically-swinging frame pivoted to members of this yoke, a horizontal member rigid with and extending rearwardly from the forward yoke, a transverse bar pivoted upon the forward yoke, supporting-wheels and vertical spindles therefor, links movably connecting said spindles with said bar, a transverse member disposed between the wheels, and having notches therein, for receiving portions of said vertically-swinging frame, and means for exerting pressure upon this frame, tending to force such portions into the notches, embodying a screw-pin supported by the rearward yoke, a vertically-slidable block thereon, notched to receive portions of the said screw-pin, and a nut and a plate for regulating the tension thereof.

10. In steering devices for vehicles, of the character specified, the combination with a longitudinal timber, and a tongue pivoted thereon to have lateral movement in either direction, of a frame extending rearwardly from the timber, a swing-plate above the rearward portion of the timber, a forward yoke and a rearward yoke, each rigid with the swing-plate, a vertically-movable frame supported by the forward yoke, a vertically-swinging frame pivoted to members of this yoke, a horizontal member rigid with and extending rearwardly from the forward yoke, a transverse bar pivoted upon the forward yoke, supporting-wheels and vertical spindles therefor, links movably connecting said spindles with said bar, a transverse member disposed between the wheels, and having notches therein, for receiving portions of said vertically-swinging frame, and means for exerting pressure upon this frame, tending to force such portions into the notches, said horizontal member having holes therein for varying the pivotal support of the transverse bar, and said links having holes therein for varying the operative length thereof correspondingly with changes made in the position of said transverse bar.

11. In steering devices for vehicles, of the character specified, the combination with a longitudinal timber, and a laterally-movable tongue, of a frame extending rearwardly from the timber, an axle connecting the rearward ends of the frame, hanger-loops secured to the ends of the axle, vertically-disposed sleeves secured thereto, spindles turnable in the sleeves and carrying wheels for the vehicle, and means intermediate of the tongue and spindles for turning the wheels in correspondence with movements imparted to the tongue in either direction, portions of said sleeves being partially received between the outer edges of said hanger-loops to prevent forward or rearward tilting of the sleeves.

12. In steering devices for vehicles, of the character specified, the combination with a longitudinal timber, and a laterally-movable tongue, of a frame extending rearwardly from the timber, two swing-plates, each mounted to turn laterally in either direction with reference to the timber, and one of them being bolted to the tongue, vertical spindles carrying supporting-wheels, a pivoted transverse bar, links movably connecting the same with said spindles, movable fulcra between the swing-plates, whereby the turning of the wheels may be effected by turning the tongue in either direction, and means in connection with the swing-plates whereby to manually turn the wheels.

13. In steering devices for vehicles, of the character specified, the combination with a longitudinal timber, and a laterally-movable tongue, of a frame extending rearwardly from the timber, two swing-plates, each mounted to turn laterally in either direction with reference to the timber, and one of them being bolted to the tongue, vertical spindles carrying supporting-wheels, a pivoted transverse bar, links movably connecting the same with said spindles, movable fulcra between the swing-plates, whereby the turning of the wheels may be effected by turning the tongue in either direction, and means in connection with the swing-plates whereby to manually turn the wheels.

14. In steering devices for vehicles, of the character specified, the combination with a longitudinal timber, and a laterally-movable tongue, of a frame extending rearwardly from the timber, two swing-plates, each mounted to turn laterally in either direction with reference to the timber, and one of them being bolted to the tongue, vertical spindles carrying supporting-wheels, a pivoted transverse bar, links movably connecting the same with said spindles, movable fulcra between the swing-plates, whereby the turning of the wheels may be effected by turning the tongue in either direction, and means in connection with the swing-plates whereby to manually turn the wheels comprising a notched member, a vertically-swinging frame, and pressure devices for the latter.

In testimony whereof I have signed my name to this specification in the presence of two subscribing witnesses.

JOHN WILLIAM LOVE.

Witnesses:
 E. N. KIRBY,
 JOHN H. MORROW.